Aug. 26, 1969  D. L. WILLIAMS  3,464,007
APPARATUS FOR SORTING ELECTRICAL COMPONENTS BY CURRENT
CONSUMPTION AT PRESCRIBED VOLTAGE
Filed Nov. 22, 1966  3 Sheets-Sheet 1

INVENTOR
D.L. WILLIAMS

BY *Curphey + Erickson*

PATENT AGENTS

INVENTOR
D. L. WILLIAMS
BY Curphey + Erickson
PATENT AGENTS

INVENTOR
D. L. WILLIAMS

United States Patent Office 3,464,007
Patented Aug. 26, 1969

3,464,007
APPARATUS FOR SORTING ELECTRICAL COMPONENTS BY CURRENT CONSUMPTION AT PRESCRIBED VOLTAGE
Dewi L. Williams, Chateauguay Centre, Quebec, Canada, assignor to Northern Electric Company Limited, Montreal, Quebec, Canada
Filed Nov. 22, 1966, Ser. No. 596,165
Int. Cl. G01r 27/14
U.S. Cl. 324—64                             9 Claims

ABSTRACT OF THE DISCLOSURE

An apparatus for sorting electrical components into various groups according to their current consumption at a prescribed voltage, having a network composed of three pluralities of resistors, one plurality being in series with a parallel arrangement of the other two pluralities. A scanner, comprising stepping relays, sequentially selects combinations of at least one resistor from each plurality of resistors to step the current through a component under test until the prescribed voltage is reached, as determined by a voltage detector. A visual readout indicates the group number corresponding to the current flowing through the component when the voltage reaches the prescribed value.

---

This invention relates to an apparatus for sorting electrical components, and in particular copper-oxide varistor discs into various groups according to their current consumption at a predetermined voltage.

To ensure matching of the discs in a varistor assembly for example, the discs have to be sorted into groups according to their current consumption at a given voltage. The width of each group, that is the range within which the current may vary for each group number, is a fixed percentage of the average current for the group and consequently increases with the average current. In other words, the higher the average current, the larger is the width of the group. Consequently the theoretical characteristic of current versus group number is not linear and any circuit for automatically sorting electrical components must be non linear.

The conventional test sets for sorting such electrical components used a motor driven servo system to balance a bridge circuit and hence to indicate the group number by means of a pointer on a dial. This has the disadvantage of slow speed and low definition; that is, it is hard for the operator to see where one group ends and the next group begins.

The test set, in accordance with the invention, comprises a network consisting of a plurality of resistors adapted to simulate the characteristic of current versus group number of the varistor under test. A scanning circuit operating in a decimal system is adapted to switch the resistors to step the current through the electrical component under test until a predetermined voltage across the component is reached. The scanning circuit also operates a display device to indicate in a decimal system the group into which the electrical component should be classified when the predetermined voltage is reached.

The invention will now be described with reference to the drawings which describe a preferred embodiment of the invention and in which.

Figure 2:
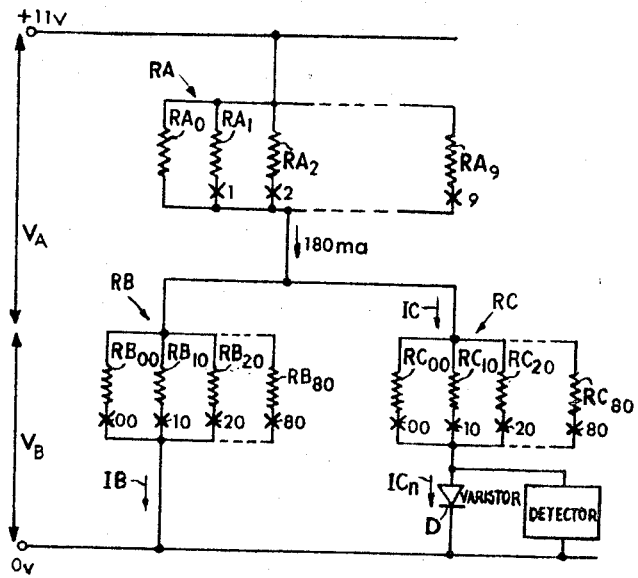
FIGURE 2 illustrates the network for matching the theoretical characteristic of current versus group number.

The varistors must be grouped according to their forward current at a predetermined voltage which for the purpose of our description we will assume to be 0.3 volt although other test voltages are acceptable. The width of each group, that is the range within which the current may vary for each group number is also assumed to be 1% of the centre value for the test voltage chosen. If an equation is formulated to satisfy the above condition so as to have the current scale divided into group numbers having a width increasing with the current consumption of the varistors, the centre value of each group will satisfy the following equation:

$$In = \frac{(1+0.01)^n}{(1-0.01)^n} I_0$$

where $In$ = value of the varistor current at the centre of group $n$
$I_0$ = centre current value of group 0
$n$ = integer representative of the group number The circuit illustrated in FIGURE 2 comprises a decade of resistors $RA_0$–$RA_9$ connected in series with a group of resistors $RB_{00}$–$RB_{80}$ across a source of voltage of 11 volts. In parallel with resistors $RB_{00}$–$RB_{80}$ is a group of resistors $RC_{00}$–$RC_{80}$ connected in series with variator D. Across varistor D is a detector for measuring the voltage across the varistor. In the circuit, RA is changed nine consecutive times by the operation of contacts 1–9 while RB and RC are changed once every nine consecutive digits by the closure of contacts 00–80, thus being operated in accordance with a decimal system. The circuit for operating the contacts will be described later.

Figure 1:
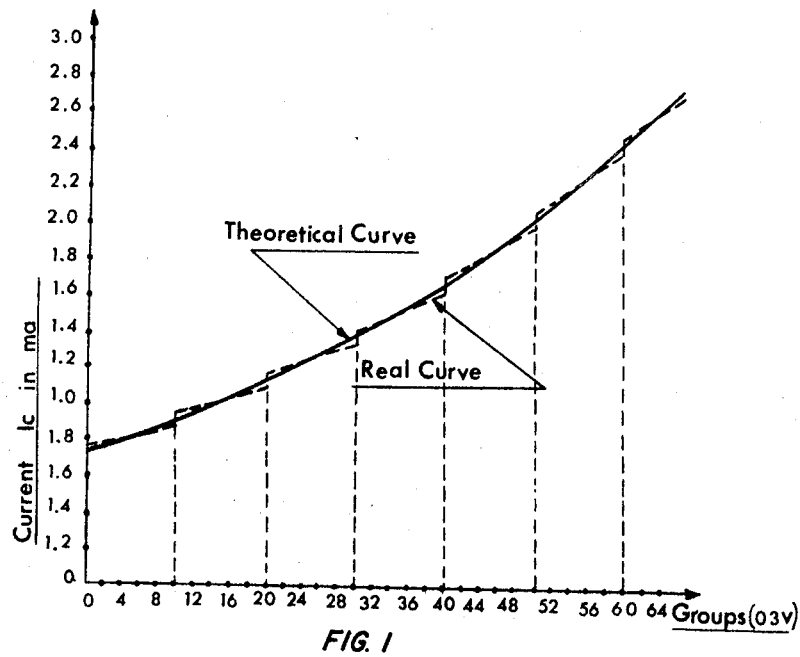
FIGURE 1 illustrates the theoretical characteristic of current versus group number for the classification of varistors as well as the curve obtained with the network, in accordance with the invention, for matching the theoretical characteristic.

In the circuit illustrated in FIGURE 2, it can be calculated from an analysis of the circuit itself that:

$$IC_n = \frac{RB_n(Vin - 0.3) - 0.3 RA_n}{RA_n RB_n + RC_n(RA_n + RB_n)}$$

where $IC_n$ = current through the varistor under test
$Vin$ = input voltage
$0.3$ = voltage across the varistor at the time of sorting In the above formula, RB and RC are constant within each decade and the above formula then takes the following form:

$$IC_n = \frac{A - BX}{C + DX}$$

wherein A, B, C, and D are constant and X is representative of RA. This equation is of the second order and by selecting proper values for RA, RB and RC, the theoretical exponential curve for current versus group number may be closely matched as illustrated in FIGURE 1.

In selecting the values of the resistors, $RC_{00}$–$RC_{80}$ are chosen so that for a varistor in the centre of each decade (i.e. in groups 5, 15, 25 etc.) having 0.3 volt across it, there will be one volt across RC and the varistor in series.

Resistors RB are then chosen so that for each decade the total current flowing through RB+RC will be the same, i.e. 180 ma. The current is arranged to be 180 ma. at the start of each decade, but will vary slightly as scanning progresses through each decade. As resistors $RA_1$, $RA_2$ and so on, are introduced, the voltage across RA drops slightly in a progressive manner. Since the initial current through RA is the same for each decade, this progressive voltage drop will also be the same for each decade. Thus, the voltage across RB increases by the same amount as scanning progresses through each decade, so the current through RB (and RC) changes by the same percentage of its starting value through each decade. The actual value of current is a design compromise; the higher the value of IB, the less will IB+IC vary with variations in the varistor current. However the higher values of IB will need a higher voltage supply V*in* and larger resistors to dissipate the heat.

Resistors RA are finally chosen to give the correct variation over each decade.

Figure 3:
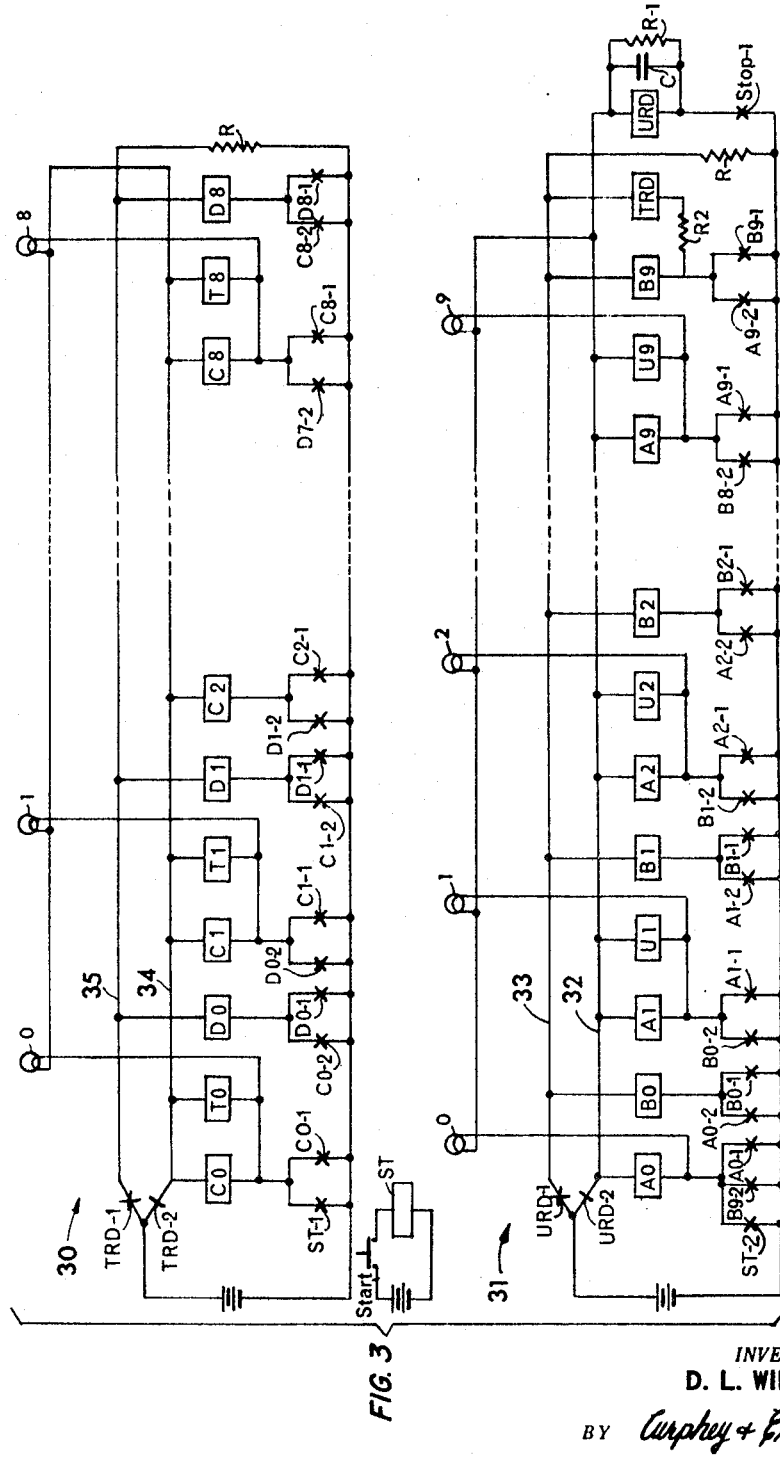
FIGURE 3 illustrates the scanning circuit for switching the resistors of FIGURE 2.

Referring to FIGURE 3, there is shown a scanning circuit comprising a decade shift register 30 and a Unit shift register 31 for switching the resistors of FIGURE 2. When the Start button is depressed, relay ST is momentarily operated. Contacts ST–1 of relay ST are closed and operate relays T0 and C0. Relay T0 switches resistors $RB_{00}$ and $RC_{00}$ in the circuit of FIGURE 2. Relay C0 is locked through its own contacts C0–1 and energizes lamp 0 (tens) of a digital display device which may be of the type commonly known.

The operation of relay ST also operates relay A0 through the closure of contacts ST–2. Relay A0 locks on its own contacts A0–1 and energizes lamp 0 (units) of the digital display device. When the voltage drop across the varistor D is 0.3 volt or higher the test set shows 00 on the digital display device and the scanning circuit is stopped by means of a detector fully explained in FIGURE 4.

Figure 4:
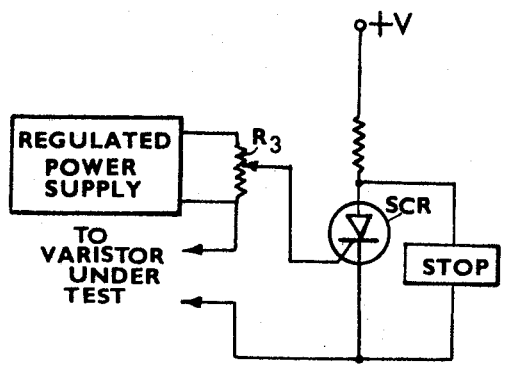
FIGURE 4 illustrates a detector for detecting the voltage across the varistors and stopping the operation of the scanning circuit.

When the voltage across varistor D is less than 0.3 v., the scanning circuit proceeds to give the first current step. Relay URD is energized by bus 32 of shift register 31 after a certain time delay determined by resistance R1 and capacitor C. Contacts STOP–1 are closed at that time by the operation of relay STOP in the detector which is shown in FIGURE 4. The operation of relay URD closes contacts URD–1 and opens contacts URD–2. The power is consequently shifted from bus 32 to bus 33 and relay B0 is operated through contacts A0–2 which are not yet opened (due to normal operating delay). Relay B0 locks on its own contacts B0–1. When relay URD releases after a predetermined delay determined by R1 and C, the power is shifted back to the lower bus 32 and relay A1 operates through contacts B0–2. Relay A1 locks on its own contacts A1–1 and lamp 1 (Units) lights up. Relay B0 is denenergized by the removal of power from bus 33.

Relay U1 in parallel with relay A1 is operated at the same time as relay A1 and switches resistor $RA_1$ in the circuit of FIGURE 2. If the voltage detected across varistor D is still below 0.3 volt relay URD will be re-operated and the power will be shifted back to bus 33. The shift register 31 will then continue to switch in numerical sequence resistances $RA_2$–$RA_9$ and will light up consecutively lamps 2–9 (units).

If the voltage across varistor D is still below its chosen test value of 0.3 volt after resistor $RA_9$ has been switched in the circuit, relay TRD operates after a short delay determined by R–2 through the closed contacts of relay B9–1. Contacts TRD–1 and TRD–2 of relay TRD transfer the power from the lower bus 34 to the upper bus 35 of the decade shift register. Relay D0 operates through the closed contacts C0–2 of relay C0 and locks on its own contacts D0–1. Relay URD releases after a certain time delay thus removing power from bus 33 of shift register 31 which deenergizes TRD.

When relay TRD is released contacts TRD–2 are closed and power is applied to the lower bus 34 of shift register 30. This operates relay C1 through the still closed contacts D0–2 of relay D0. Relay C1 locks on its own contacts C1–1 and operates lamp 1 (Tens). Relay T1 in parallel with relay C1 also operates and switches resistor $RB_{10}$ and $RC_{10}$ in the circuit of FIGURE 2.

The release of relay URD also establishes a circuit for reenergizing relay A0 in shift register 31 through contacts B9–2 of relay B9. This energizes lamp 0 (Units) and recycles shift register 31 which then repeats the stepping of resistors $RA_1$–$RA_9$ as described above. When shift register 31 has switched resistor $RA_9$, switch register 30 will switch resistors $RB_{20}$ and $RC_{20}$ and so on until the predetermined voltage across D is reached.

In FIGURE 4 is shown a detector which may be used in the circuit illustrated in FIGURE 2. It comprises a silicon control rectifier (SCR) having two terminals connected in series with a source of power and a third gate terminal connected to the varistor D in FIGURE 2. The gate voltage of the SCR is chosen to correspond to the test voltage across varistor D in series with the regulated output of a constant power supply whose value is adjusted by resistor R3. This adjustment and the polarity of the supply are such as to fire the SCR when the voltage across the varistor under test is 0.3 volt. The firing of the SCR short circuits relay STOP in parallel with it and relay STOP is released. The release of relay STOP opens contacts STOP–1 in the circuit of relay URD (FIGURE 3) thus stopping the shifting of the registers which lock on the last lighted lamps. The lamps on the display device indicate to the operator which is doing the sorting of the varistor discs in which group the particular varistor disc under tests should be classified.

It is to be understood that various modifications may be made to the above described test circuit within the intended scope of the invention. For example other type of shift registers operating in a decimal system may be used. Also other type of detectors may be used. Furthermore, the circuit may be modified to perform the sorting operation at various test voltages other than 0.3 v.

What is claimed is:

1. An apparatus for sorting electrical components into a plurality of groups according to the current consumption of said components at a prescribed voltage, each group representing a range of current having a width which is a non-linear function of the average current of the range, said apparatus comprising:
    (a) a source of voltage;
    (b) a network connected to said source of voltage and comprising a first plurality of resistors in series with a parallel arrangement of a second plurality of resistors and a third plurality of resistors, said network being adapted for sequentially connecting said components in series with said third plurality of resistors;
    (c) a scanning circuit connected to said network and operable to selectively combine resistors from each of said pluralities of resistors to apply to a component a succession of currents representing the limits of said groups; and
    (d) voltage detecting means connected to said component and to the scanning circuit for stopping the operation of the scanning circuit when the voltage across the component reaches said prescribed voltage.

2. An apparatus as defined in claim 1 wherein said scanning circuit comprises two shift registers, one for the units and one for the decades.

3. An apparatus as defined in claim 2 wherein the unit shift register comprises a chain of relays which are operated sequentially to switch the unit resistors in numerical order until resistor number 9 is in the network, the operation of the last relay of the chain initiating the operation of the decade shift register and resetting the unit shift register back to 0.

4. An apparatus as defined in claim 3 wherein the decade shift register comprises a chain of relays which operate once after each operation of the last relay of the unit shift register to switch the decade resistors.

5. An apparatus as defined in claim 3 wherein each relay operates a lamp which indicates the number of the respective unit resistor.

6. An apparatus as defined in claim 4 wherein each relay associated with the unit shift register operates a lamp which indicates the number of the respective unit resistor and each relay associated with the decade shift register operates a lamp which indicates the number of the respective decade resistor.

7. An apparatus as claimed in claim 1 wherein said first plurality of resistors in said network comprises ten resistors representing the units of the decimal system, said second and said third pluralities of resistors represent the decades, and said scanning circuit operates on the decimal system.

8. An apparatus as defined in claim 7 wherein the scanning circuit selectively combines resistors from each of said second and third pluralities of resistors to feed the same current through the first plurality of resistors at the beginning of each decade.

9. An apparatus as defined in claim 6 wherein said voltage detecting means is adapted to maintain the last-operated lamps lighted for indicating the group number in the decimal system when the voltage across a component reaches the prescribed voltage.

References Cited

UNITED STATES PATENTS

| | | | |
|---|---|---|---|
| 3,065,414 | 11/1962 | Sears et al. | 324—57 |
| 3,134,073 | 5/1964 | Dickerson | 324—158 |
| 3,278,849 | 10/1966 | Emery | 324—158 |

EDWARD E. KUBASIEWICZ, Primary Examiner

U.S. Cl. X.R.

209—81; 324—57, 58